Patented Feb. 8, 1927.

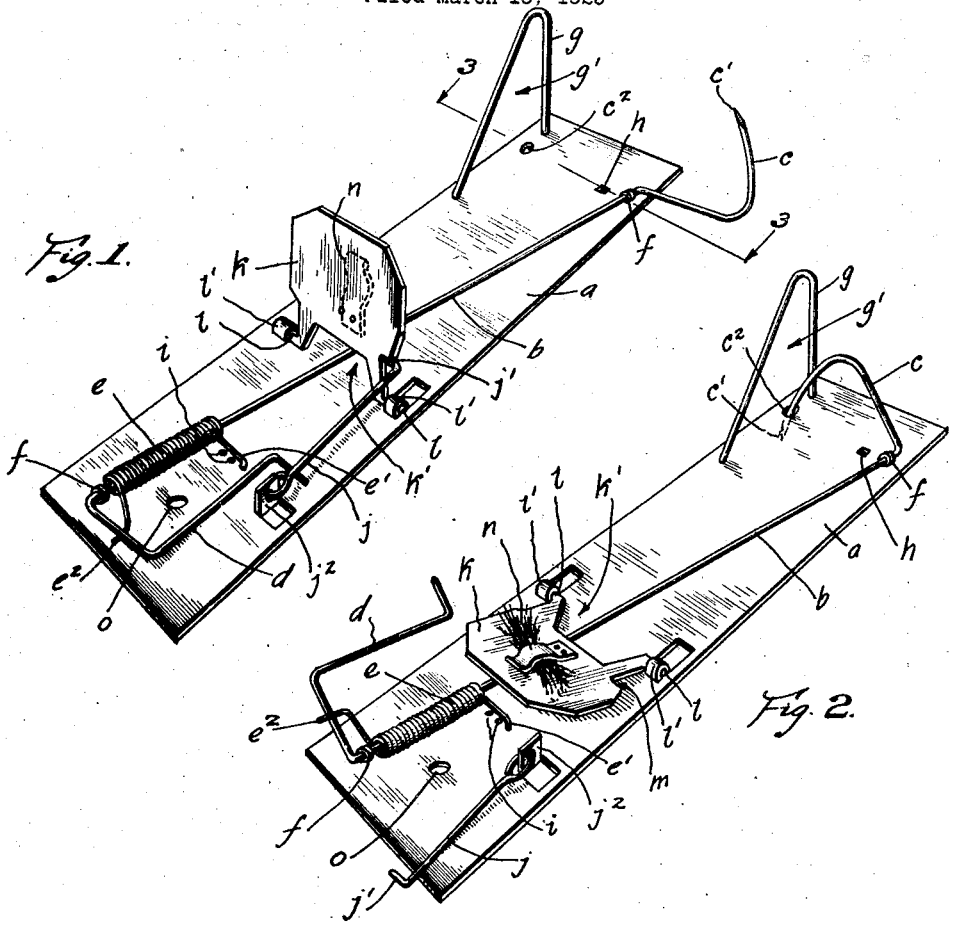
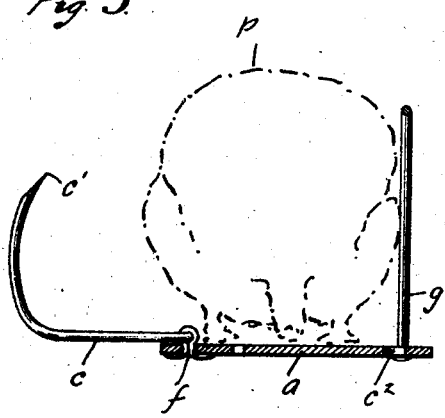
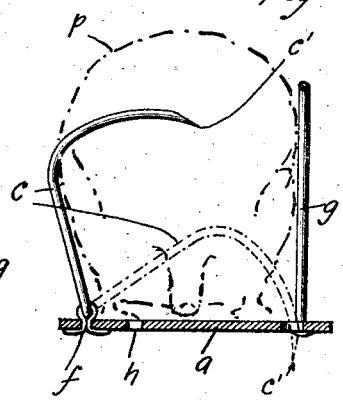

1,616,786

UNITED STATES PATENT OFFICE.

HENRY DORN, OF ECHO, OREGON.

IMPALING ANIMAL TRAP.

Application filed March 19, 1925. Serial No. 16,771.

As well known, gophers and other burrowing animals, burrow a channel or runway in the ground in which they move about, and if these runways are blocked by an obstruction the animal will seek to remove the same.

The object of my invention is to provide a trap which may be placed in one of these runways, and is provided with a gate-like trigger which, when set, constitutes an obstruction of the runway, thus tending to excite the animal to remove the obstruction, and in that way spring the trap.

A further object of my invention is to provide a trap which effects the capture of the animal by impaling it.

A still further object of my invention is to provide a trap which is sensitive, so that it may be easily sprung; and of which the working parts are adjustable so that they may be arranged relatively to the thickness of the animal's body; and also to make the impaling end of the trap narrower so that the trap may be inserted in runways of smaller cross section; for in the fall of the year these animals are generally young and slim and make smaller holes. It is further my object to make my trap simple and inexpensive.

I attain my objects in a trap comprising an elongated flat base, on which is mounted a spring-controlled impaling element, consisting of a rotatable shaft arranged lengthwise of the base, terminating at one end in an impaling hook located opposite an impaling wall or abutment; and said impaling hook being given an arcuate movement across the base upon the rotation of the shaft thereby pinning the animal against said abutment and impaling it. A gate-like trigger is hinged at the middle of the base on an axis permitting the gate to be swung longitudinally of the latter in either direction; and a latch-bar is hinged on that, and is adapted to be engaged with said trigger, when the latter is set; said spring-controlled shaft being restrained in one position by said latch-bar when the trigger is set, and when the latter is moved by the impact it will release the latch-bar and spring the trap.

Since my trap may be sprung by movement of the trigger inward as well as outward in the runway, I provide on the interior face of the trigger means for fastening thereto dry grass, and the like, which will attract the animal, since it may want this material for bedding in its nest. The dry grass will also serve to conceal the trigger, and the animal will in consequence more readily approach the trap, and try to pull the grass further into the runway, and in so doing spring the trap.

Other features of my invention, as well as its construction and operation, are hereinafter fully described with reference to the accompanying drawings, in which:

Fig. 1 is a perspective view of my improved impaling animal trap set for trapping;

Fig. 2 is a perspective view of my trap after having been sprung;

Fig. 3 is a sectional view taken on the line 3—3 of Fig. 1, of the impaling spike and adjacent impaling abutment; and Fig. 4 is a section similar to Fig. 3 with the impaling spike shown as arranged after the trap has been set, and the impaling spike being in dotted lines as it appears after the trap has been sprung.

My animal trap embodies an elongated flat base $a$ relatively narrow upon which the spring-controlled impaling element is mounted. This element consists of a rotatable shaft $b$ which is mounted substantially lengthwise of the base $a$, and which terminates at one end in an impaling hook or prong $c$, which, upon the rotation of the shaft, is given an arcuate movement across the base $a$. The other end of said rotatable shaft $b$ terminates in a laterally extending control arm $d$. A spirally wound torsion-spring is mounted on said rotatable shaft $b$, with one end ($e'$) thereof engaging the base $a$, and its other end ($e^2$) engaging the lateral control-arm $d$. Said rotatable shaft is journaled in eye-shaped members or bearings $f$ and $f'$ $f$—preferably cotter keys or pins—which extend through the base $a$. An impaling abutment as $g$ or equivalent structure, is provided on one side of said base in alinement with its said impaling prong end $c$. Said impaling abutment preferably is adapted to provide an aperture $g'$ into which the impaling prong strikes. I have noticed that gophers and similar burrowing animals vary considerably in weight and girth at different seasons. Thus if my trap is to be used in the fall of the year, when gophers are numerous but slim or small in girth, the impaling prong should be positioned relatively to the impaling abutment. For this reason I provide an auxiliary hole $h$, in said base to which the cotter key bearing $f'$ for the shaft $b$ may be moved.

A hole $c^2$ is provided in the base through which the point $c'$ of said impaling prong $c$ may strike when the shaft has been moved as mentioned. This construction has a two-fold purpose: It prevents the point of the impaling prong being dulled; it also assures that the animal will be securely held, even though the impaling prong passes only through a section of loose movable skin of the animal. Such is frequently the case with small or slim animals. If the point of the impaling hook did not pass into the base, but rested merely on it, the animal might wriggle loose; but with the point of the impaling hook extended through the base, the animal is firmly pinned in place In order to cause this result the impaling abutment is preferably made in skeleton form as shown in the drawings.

Thus, if the cotter key bearing $f'$ be moved to the hole $h$, then the point of the impaling prong $c$ will strike between the legs of the impaling abutment, and in so doing will pin the animal in place. I also provide a series of holes $i$ for the bent extremity $e'$ of the spirally wound torsion spring $e$, so that when the prong end of said rotatable shaft is adjusted relatively to the impaling abutment, the end $e'$ of said torsion spring can be moved correspondingly.

I hinge a latch-bar $j$ to said base at a point $j^2$ adjacent the lateral arm $d$ of said shaft. Said latch-bar is so arranged that it may extend across the offset end $d'$ said lateral arm of the shaft, and be engaged with the lower edge of one side of the gate-like trigger $k$, which is hinged at approximately the middle of the base, upon an axis transverse thereof so that said trigger may be sprung by a movement longitudinally of the base, in either direction. Said gate-like trigger may be hinged on the base in the manner illustrated at $l$ and $l'$ of the Figs. 1 and 2. The base $a$ with the hinge-lugs $j^2$ and $l'$ can all be conveniently and economically stamped out of sheet metal; at the same time punching the base of holes $c^2$, $h$, $i$ and $o$; the latter to receive the point of the impaling prong as above described. The perimeter of the trigger $k$ is formed to correspond roughly to the cross section of a burrow or runway. Said gate-like trigger, therefore, constitutes a barrier across said runway. The trigger is provided with a shoulder $m$ with which the offset portion $j'$ on said latch-bar $j$ is engaged, when the trap is set as shown in Fig. 1. Said offset portion $j'$ is substantially of the same width as the thickness of said shoulder $m$ of the trigger. Thus, this engagement is very sensitive, and a slight movement of the trigger in either direction will release said latch-bar and spring the trap. See Figs. 3 and 4 in which $p$ represents the gopher.

The underside $k'$ of said gate-like trigger is cut away so that said trigger may straddle the rotatable-shaft $b$. On one side of said trigger $k$ I provide a spring-clasp $n$ upon which dry grass or moss may be fastened. I have found by experience, in trapping a large number of gophers, that these animals are usually not in search of food because they find an abundance of that in the ground; hence are not enticed by fastening bait to the trigger. But these animals are frequently in search of bedding material; and therefore if bedding material be fastened to the trigger, and so arranged as to cover and conceal the latter, the animal is, as a general rule, enticed to seize the bedding material, and pull it further into the runway, and in so doing spring the trap. This is the way in which I have caught large numbers of gophers.

I preferably provide a hole in the base as at $o$ in which to insert a spike to fasten the trap to the floor of the runway, and thereby prevent the trap from being carried away with the carcass of the gopher by crows or cats. I have noticed that many traps have been lost in that way.

The base of my trap is preferably made flat and narrow so that it can be easily inserted in the burrow or runway without requiring the latter to be dug away to any considerable extent.

The trap when inserted in the runway is so arranged that the impaling prong $c$ is forward of the trigger $k$ in the direction from which the animal is likely to approach. With the devices set, the gate-like trigger $k$ will constitute an obstruction in the runway or burrow as described. The specific details of the elements of my invention may be varied to suit the manufacturer of my trap, so long as its principle of operation, above described be adhered to.

I claim:

1. In an animal trap of the character described, a base, an impaling abutment on the base, a rotatable shaft terminating at one end in a perpendicular curved impaling prong, a spring element controlling, and placed in tension by the rotation of said shaft, bearings on the base for the opposite ends of said shaft, one of such bearings pivoting and the other being movable, whereby to permit the adjustment of the prong-end of the shaft relatively to said impaling abutment, a gate-like trigger hinged at the middle and transversely of the base and means for engaging the shaft with the trigger when said spring is placed in tension.

2. In an animal trap of the character described, a base, a shaft provided with a lateral arm at one end, and with a perpendicular curved impaling prong at its other end, a pivoted bearing on the base for the arm end of said shaft, a coiled torsion spring mounted on said shaft adjacent said pivotal bearing, the opposite end of said coiled spring being formed with lateral arms, respectively, one of which arms engages with said shaft and the other being movably fastened to the base, an impaling abutment adjacent the impaling prong of said shaft and a movable bearing on the base for the impaling prong end of said shaft, whereby to arrange such end relatively to said impaling abutment.

3. The combination set forth by claim 1, distinguished in that the base is provided with a hole located to receive the point of the impaling prong.

4. In an animal trap of the character described, a base, a shaft consisting of a wire formed with a lateral arm at one end, and with a perpendicular curved impaling prong at its other end, a pivoted bearing on the base for the arm end of said shaft, a coiled torsion spring mounted on said shaft adjacent said pivotal bearing, the opposite end of said coiled spring being formed with lateral arms, respectively, one of which arms engages with said shaft and the other being movably fastened to the base, an impaling abutment adjacent the impaling prong of said shaft and a movable bearing on the base for the impaling prong end of said shaft, whereby to arrange such end relatively to said impaling abutment.

5. In an animal trap of the character described, a base, a shaft with a lateral arm at one end, and with a perpendicular curved impaling prong at its other end, a pivoted bearing on the base for the arm end of said shaft, a coiled torsion spring mounted on said shaft adjacent said pivotal bearing, the opposite end of said coiled spring being formed with lateral arms, respectively, one of which arms engages with said shaft and the other being provided with a bent extremity movably secured to the base and an impaling abutment adjacent the impaling prong of said shaft.

6. An animal trap of the character described comprising a base, an impaling element comprising a rotatable spring controlled shaft on the base said shaft terminating at one end in a lateral arm and at its opposite end in an impaling prong extending perpendicular to the base, an impaling abutment at one side of the base in alinement with said impaling prong, a gate-like trigger hung at the middle of the base on an axis permitting it to be swung longitudinally of the latter in either direction and a latch bar hinged on the base adapted to be engaged with said shaft-arm to restrain said shaft when under tension, the free extremity of the latch bar being provided with a lateral projection adapted for being engaged with the lower edge of one side of the trigger when the latter is set, said lateral arm being provided with an offset on which said latch bar bears.

HENRY DORN.